Nov. 24, 1942.                H. BUCKLIN                2,303,018
INDICATING DEVICE
Filed Dec. 2, 1940
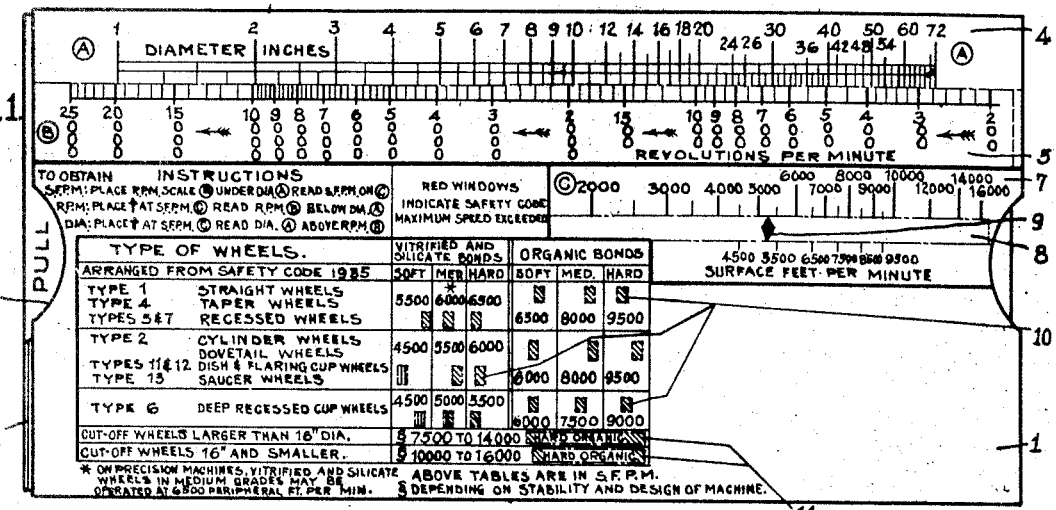
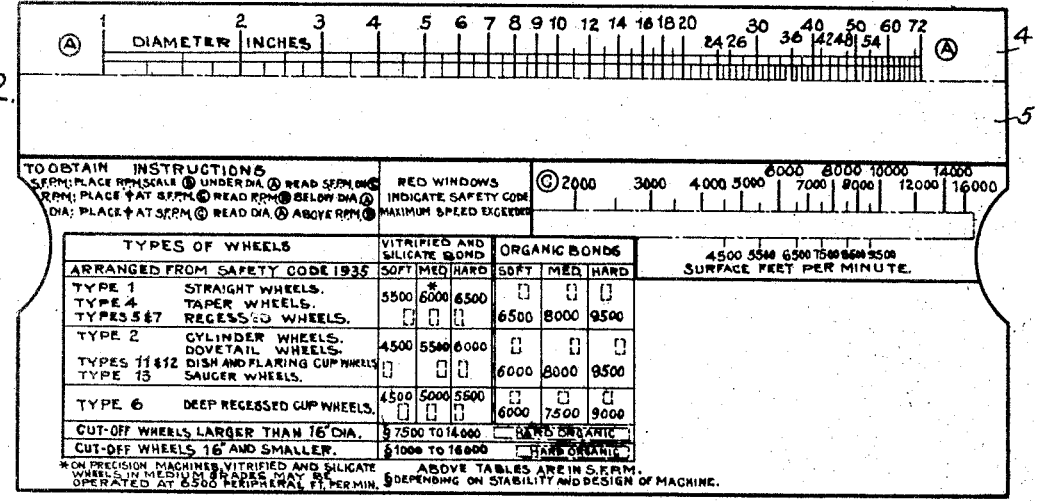
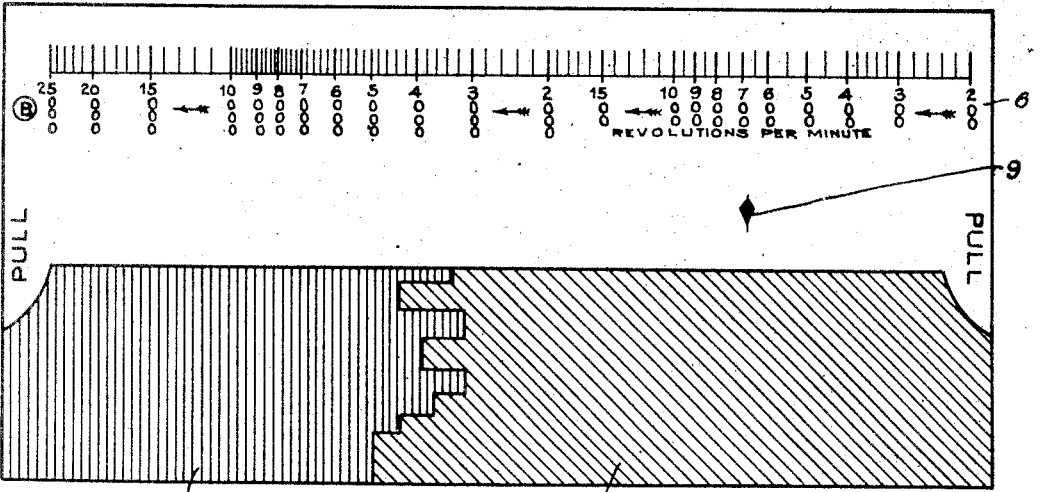
INVENTOR.
HARRISON BUCKLIN
BY
ATTORNEY.

Patented Nov. 24, 1942

2,303,018

UNITED STATES PATENT OFFICE 2,303,018

INDICATING DEVICE

Harrison Bucklin, Rochester, N. Y., assignor to The Carborundum Company, Niagara Falls, N. Y., a corporation of Delaware Application December 2, 1940, Serial No. 368,203

5 Claims. (Cl. 235—89)

This invention relates to devices for indicating when and if conditions of safety have been exceeded. More specifically, the invention relates to a speed and safety indicator for use in the determination of the safe operation of abrasive wheels.

One object of the invention is to provide a device which when set to correspond to known conditions will indicate whether such conditions exceed the safe limits for particular materials. Another object is to provide means for indicating whether the operation of a particular abrasive wheel at a speed of a predetermined surface feet per minute comes within or exceeds the standards of safety set for such wheel.

A further object is to provide means for computing the surface feet per minute of a wheel, given the diameter and the revolutions per minute at which the wheel is operated, in combination with visible means for indicating whether the surface feet per minute thus computed comes within or exceeds the standards of safety set by the American Engineering Standards Safety Code for the use, care and protection of abrasive wheels, for such wheels. Another object of the invention is to provide, in combination with a safety indicator, means for determining the rotative speed in revolutions per minute at which a wheel of given diameter should be operated when the surface feet per minute is given, or by which the diameter of a wheel can be calculated when the surface feet per minute and the revolutions per minute are known.

Further objects of the invention will become apparent from the following description taken in connection with the accompanying drawing wherein:

Fig. 1 is a view of the front face of the device which is set to illustrate the operation thereof;

Fig. 2 is a plan view of the stationary member or holder; and

Fig. 3 is a plan view of the face of the movable member or slide.

Referring to the drawing, the illustrated embodiment of the invention shown therein comprises a stationary member or holder 1, preferably in the from of an envelope or wrapper which may be made of Celluloid or any other suitable material such as cardboard or the like. A movable member or slide 2 of Celluloid, cardboard or any other suitable material having an area substantially the same as the holder 1 is adapted to slide within the holder with a fit sufficient to hold it in various positions of longitudinal adjustment with respect to the holder. At opposite ends of the holder are thumb notches 3 exposing end portions of the slide to facilitate grasping and sliding of the slide relative to the holder.

At "A" on the stationary member 1 is a logarithmic scale 4 representing the diameter of an abrasive wheel in inches. Immediately below the scale 4 is an elongated aperture or window 5 through which a logarithmic scale 6 appearing on the slide 2 and identified as "B" can be seen when the slide is in position within the holder. This logarithmic scale 6 is laid out in revolutions per minute and is an inverted scale. Immediately below the window 5 of the holder 1 and extending across approximately one-half of the holder is a logarithmic scale 7, indicated on the holder as "C," which is laid out according to wheel speed in surface feet per minute. The logarithmic scale 7 is divided by an elongated aperture or window 8 through which an indicator 9 on the movable member 2 can be seen. The indicator 9 is placed on the slide in cooperative relationship with scale 7.

The holder 1 also comprises a simple and condensed table imprinted on the face of the holder giving various types of abrasive wheels and their respective permissive speeds. A number of small apertures or windows 10 and 11 are positioned within this table through which the indicators 13 and 14 correspondingly located on the slide 2 can be viewed. These indicators 13 and 14, if desired, may be conveniently colored green and red to correspond to the conventional means of indicating safety and danger, the dividing line between the red and the green portions being adjusted to permit the different colors to appear in different windows.

The logarithmic scales 4, 6 and 7 and the indicator 9 are so proportioned and positioned with respect to each other that, in the operation of the device, when the slide 2 is adjusted to bring the known revolutions per minute on the scale 6 below a predetermined diameter on scale 4, the indicator 9 registers the speed in surface feet per minute on the scale 7. The indicators 13 and 14 are positioned and designed with respect to the windows 10 and 11 and with respect to the scale 7 that at the same time the slide 2 is adjusted to secure the speed in surface feet per minute on the scale 7, one of the indicators appears in the window corresponding to the particular type of wheel to be used. When the resultant speed is within the limits set by the safety code, the safety indicator 14 appears, and when the rate of speed is in excess of that prescribed, the danger indicator 13 appears in the particular window.

The form of table imprinted on the face of the holder in combination with the series of windows 10 and 11 which I prefer to use consists of a listing of the various standard types of abrasive wheels in conjunction with the different kinds of bond used in the manufacture of abrasive wheels. Abrasive wheels are provided in a considerable range of grits and grades, by which is meant the size of the abrasive particles employed in the wheel and the relative proportion of bond which determines the grade. Wheels are also made in different types of bond which can be divided into two main classes; the inorganic bonds which are either vitrified or silicate, and the organic bonds which are resin, rubber or shellac bonds. These wheels are made in a great many shapes and sizes, and the speeds in surface feet per minute at which these various types of wheels may be safely operated have been determined by trial and specified by the American Engineering Standards Safety Code. The softer wheels, which contain relatively small proportions of bond, will rupture at speeds lower than those which can be safely used with hard wheels, which contain more bond. Organic bonds are well known to be stronger than the vitrified or silicate bonds and such wheels can be operated at greater speeds than can the inorganic bonds.

Therefore, in this particular embodiment of the invention, the table on the holder 1 is divided into two sections representing the two main classes of bonds, the vitrified and silicate bonds and the organic bonds. Such columns are divided into sub-columns for soft, medium and hard bonds, and each sub-column contains a small vertical window or aperture through which the danger indicator can be seen when the permissive speed has been exceeded. If it is desired to be able to ascertain when the excessive speed is being approached, the vertical window may be designed with a horizontal opening at the side of the window and about one-third of the height of the window through which the approach of the danger indicator may be viewed.

The speed at which a wheel can be safely operated is determined by the surface feet per minute at which the wheel travels rather than the revolutions per minute since the stresses set up in the wheels by reason of their rotation are a function of the peripheral velocity. Consequently, in determining whether a particular wheel can be safely operated at a given number of revolutions per minute, it is necessary to calculate the speed in surface feet per minute which will correspond to such condition for a wheel of the particular diameter.

Inasmuch as it is customary to designate the diameter of abrasive wheels in inches, and the peripheral speed thereof in feet per minute, it is necessary to convert the inches of diameter to feet of circumference according to the formula $$\frac{D \times \pi}{12}$$

in which D is the diameter in inches, and to multiply that by the number of revolutions per minute. Thus, two multiplying steps and one dividing step are indicated. However, since $\pi/12$ is a constant and the logarithm of that constant remains the same, the conversion of the diameter in inches to feet per minute can be made by one setting of the device if the scale upon which the results are read is displaced a distance equivalent to the logarithm of that constant. For example, in the specific embodiment shown, the scale 7, identified as "C," is placed at a convenient location and the indicator 9, instead of being shifted the same distance as scale 7 has been shifted, is displaced less by a distance equivalent to the logarithm of the constant, because the characteristic of the logarithm of the constant $\pi/12$ is negative.

The indicators 13 and 14 are controlled by the scale 7 showing the surface feet per minute in order that when the slide is positioned with respect to that scale as determined by the position of the indicator 9, the indicators 13 and 14 will appear in the windows 10 and 11.

Referring to Figure 1, the slide has been adjusted to bring the indicator 9 into registry with the surface speed of 5000 feet per minute. The indicators appearing in windows 10 and 11 indicate that soft wheels of types 2, 11, 12, 13 and 6 within the table on the holder cannot be safely operated but that all of the other wheels are well within the limits of safety. As the surface feet per minute is increased, either by increasing the number of revolutions per minute that the wheel is operated or by using a wheel of larger diameter at the same number of revolutions per minute, the movement of the indicator 9 on the slide 2 causes the danger indicator to appear in the other windows wherever the safe speeds for the wheel are exceeded. Thus, if the surface speed is increased to 6000 feet per minute, the movement of the slide to bring the indicator 9 in registry therewith causes the danger indicator to appear in the windows pertaining to all soft vitrified and silicate bonded wheels; to the medium wheels of types 2, 11, 12, 13 and 6 of the vitrified and silicate bonds; and to hard wheels of these bonds in type 6. Further increasing the surface speed to 7000 feet per minute effects the movement of the slide which brings the danger indicator in registry with all the windows except those windows pertaining to medium or hard organic wheels.

In the utilization of the device, if the surface feet per minute is known, it is merely necessary to set the indicator 9 at the point on scale 7 where such speed is indicated, whereupon the indicators 13 and 14 will signal in the windows 10 and 11 whether or not the particular wheel desired to be used can be safely operated at such speed. Where the surface feet is not known, the slide 2 is adjusted to bring the rate of speed in revolutions per minute as shown on scale 6 immediately beneath the diameter of the wheel shown in inches on the scale 4. The position of the indicator 9 on the scale 7 will give the surface feet per minute. For example, a wheel 19 inches in diameter rotating at 1400 revolutions per minute has a surface speed of 7000 surface feet per minute, at which speed the safety indicator will indicate that only the medium or hard organic bonded wheels may be operated.

At times, it is desirable to calculate the speed at which a particular wheel may be rotated and still be within the safe limits. For example, in order to determine the safe speed for a type 1, 4, 5 or 7 wheel in the soft grade of organic bond, the slide 2 is moved from right to left until the danger indicator disappears and the safety indicator appears, at which time the indicator will be in registry with the maximum permissive speed on scale 7 which, for the types mentioned, is 6500 surface feet per minute. The size of abrasive wheel it is planned to use or which is available is ascertained and, from inspection of scale B, the number of revolutions per minute at which that particular wheel may be operated to remain below the maximum permissive speed indicated on scale C is readily obtained.

The diameter of the wheel being known, the rotative speed in revolutions per minute at which such wheel can be operated to reach this surface speed can be read on scale 6 directly under the known diameter as shown on scale 4. As illustrative, a wheel 16 inches in diameter can be rotated safely at about 1540 revolutions per minute. Conversely, if the speed at which the wheel is to be operated is known, as is the case when a particular machine having a definite rotative speed on a spindle is to be used, the maximum diameter of the wheel which can be used on the spindle can be determined by adjusting the slide 2 so that the safety indicator completely, and just completely, replaces the danger indicator in the window corresponding to the particular type and bond to be used, and thereupon reading on scale 4 the diameter which appears immediately above the known revolutions per minute appearing on scale 6.

I have explained my invention by illustrating and particularly describing a specific embodiment thereof, but it will be readily appreciated that various modifications may be made in the structure and arrangement of parts without departing from the scope of the invention. Also, I have described my invention with respect to its employment in connection with abrasive wheels. However, it may be used in other fields where the elements of safety and danger enter into the calculation of operations, such as in the operation of circular saws, fly wheels, centrifuges and the like. It also is useful in connection with the safe carrying capacity of electric cables and in connection with the speeds and feeds employed in metal working operations.

I claim:

1. The combination comprising a plurality of members in slidable relationship and each having a logarithmic scale laid out thereon, the said scales being positioned on the members in adjoining positions, one of said scales being an inverted logarithmic scale, an indicator in fixed relationship to one of said movable members but movable therewith, and means for displaying said indicator when the product corresponding to the relative positions of the logarithmic scales exceeds a predetermined value.

2. The combination comprising a member having a logarithmic scale laid out thereon and also having an indicator thereon in fixed position with respect to said scale, a second member superimposed upon the first member and in slidable relationship therewith, the said second member having a logarithmic scale laid out thereon and a window adjoining said scale through which the logarithmic scale of the first member is visible, and means for displaying the indicator carried by the first member when the product corresponding to the relative positions of the logarithmic scales exceeds a predetermined value.

3. A device for determining operating speeds for moving mechanisms such as grinding wheels and the like which comprises a plurality of members in adjustable relationship to one another and having mounted thereon means for computing the operating speeds obtained by certain combinations of variables and cooperating means in fixed relationship to said computing means for indicating by display of a warning signal when said computed operating speeds exceed safe limits of operation.

4. The combination comprising a plurality of members in slidable relationship and each having a logarithmic scale laid out thereon, the scales being positioned on the members in adjoining positions, one of said scales being an inverted logarithmic scale, indicators in fixed relationship to one of said movable members but movable therewith, means for displaying said indicators, said indicators being so located with respect to the one member with which they are movable and said indicator displaying means being so arranged that it displays one indicator when the product corresponding to the relative positions of the logarithmic scales is equal to or less than a predetermined value and that it displays another of the indicators when the product corresponding to the relative positions of the logarithmic scales exceeds the same said predetermined value.

5. The combination comprising a member having a logarithmic scale laid out thereon and also having an indicator thereon in fixed position with respect to said scale, a second member superimposed upon the first member and in slidable relationship therewith, the second member having a logarithmic scale laid out thereon, one of the aforementioned logarithmic scales being inverted, said second member having a window adjoining said scales through which the logarithmic scale of the first member is visible, said second member also having windows for displaying the indicator carried by the first member, said windows being arranged along the length of the logarithmic scales whereby the indicator is progressively displayed in successive windows on relative movement of the two members, each of said indicator display windows being so located in the second member that it displays the indicator only when the product corresponding to the relative position of the logarithmic scales exceeds a predetermined value, said predetermined value being different for each of said indicator displaying windows.

HARRISON BUCKLIN.